United States Patent
Metius et al.

(10) Patent No.: US 8,377,417 B2
(45) Date of Patent: Feb. 19, 2013

(54) METHOD AND APPARATUS FOR SEQUESTERING CARBON DIOXIDE FROM A SPENT GAS

(75) Inventors: Gary E. Metius, Charlotte, NC (US); James M. McClelland, Jr., Cornelius, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 296 days.

(21) Appl. No.: 12/762,618

(22) Filed: Apr. 19, 2010

(65) Prior Publication Data

US 2010/0264374 A1    Oct. 21, 2010

Related U.S. Application Data

(60) Provisional application No. 61/170,999, filed on Apr. 20, 2009.

(51) Int. Cl.
C01B 3/24 (2006.01)
C01B 3/38 (2006.01)

(52) U.S. Cl. ......................................... 423/650; 252/373

(58) Field of Classification Search ................... 423/650
See application file for complete search history.

(56) References Cited

U.S. PATENT DOCUMENTS

| | | | |
|---|---|---|---|
| 3,764,123 A * | 10/1973 | Beggs et al. | ................... 266/140 |
| 3,945,944 A | 3/1976 | Kang | |
| 4,047,935 A | 9/1977 | Barnhart | |
| 4,062,529 A | 12/1977 | Altenhoner et al. | |
| 4,156,659 A | 5/1979 | Barnhart | |
| 4,216,011 A | 8/1980 | Martinez Vera et al. | |
| 4,336,063 A | 6/1982 | Guzman-Bofill et al. | |
| 4,363,654 A | 12/1982 | Frederick et al. | |
| 4,370,162 A | 1/1983 | Dominquez-Ahado et al. | |
| 4,428,772 A | 1/1984 | Dominguez-Ahedo et al. | |
| 4,529,440 A | 7/1985 | Jordan | |
| 4,537,626 A | 8/1985 | Pfeiffer et al. | |
| 4,553,742 A | 11/1985 | Summers et al. | |
| 4,584,016 A | 4/1986 | Becerra-Novoa et al. | |
| 4,591,380 A | 5/1986 | Summers et al. | |
| 4,685,964 A | 8/1987 | Summers et al. | |

(Continued)

OTHER PUBLICATIONS

Ullah et al.; Has DRI's Time for Wider Acceptance Come?; Apr. 1991 Ironmaking Conference Proceedings, vol. 50, pp. 777-788 (published contemporaneously). Available on ProQuest-CSA at http://www.csa.com/partners/viewrecords.php?requester=gs&collection=TRD&recid=199207420606MD.

*Primary Examiner* — Melvin C Mayes
*Assistant Examiner* — Kenneth Vaden
(74) *Attorney, Agent, or Firm* — Clements Bernard PLLC; Christopher L. Bernard; Lawrence A. Baratta, Jr.

(57) ABSTRACT

A method and apparatus for sequestering carbon dioxide from a waste gas and reusing it as a recycled gas without emissions concerns, including: given a gas source divided into a process gas and a waste gas: mixing the process gas with a hydrocarbon and feeding a resulting feed gas into a reformer for reforming the feed gas and forming a reducing gas; and feeding at least a portion of the waste gas into a carbon dioxide scrubber for removing at least some carbon dioxide from the waste gas and forming a carbon dioxide lean gas that is mixed with the reducing gas. Optionally, the method also includes feeding at least a portion of the waste gas into the carbon dioxide scrubber for removing at least some carbon dioxide from the waste gas and forming a fuel gas after the addition of a hydrocarbon that is fed into the reformer. Optionally, the gas source and the reducing gas are associated with a direct reduction process for converting iron oxide to metallic iron in a reduction furnace that utilizes the reducing gas, optionally after some modification, and produces the gas source.

14 Claims, 2 Drawing Sheets

U.S. PATENT DOCUMENTS

| | | | |
|---|---|---|---|
| 4,734,128 | A | 3/1988 | Becerra-Novoa et al. |
| 4,756,750 | A | 7/1988 | Bixler et al. |
| 4,834,792 | A | 5/1989 | Becerra-Novoa |
| 4,880,458 | A | 11/1989 | Martinez-Vera et al. |
| 4,880,459 | A | 11/1989 | Coyne |
| 4,897,113 | A | 1/1990 | Becerra-Novoa et al. |
| 4,900,356 | A | 2/1990 | Hoffman |
| 5,064,467 | A | 11/1991 | Dam et al. |
| 5,078,787 | A | 1/1992 | Becerra-Novoa et al. |
| 5,082,251 | A | 1/1992 | Whipp |
| 5,437,706 | A | 8/1995 | Edelson |
| 5,437,708 | A | 8/1995 | Meissner et al. |
| 5,445,363 | A | 8/1995 | Becerra-Novoa et al. |
| 5,582,029 | A | 12/1996 | Occhialini et al. |
| 5,618,032 | A | 4/1997 | Meissner et al. |
| 5,676,732 | A | 10/1997 | Viramontes-Brown et al. |
| 5,752,995 | A | 5/1998 | Kang |
| 5,833,734 | A | 11/1998 | Cip et al. |
| 5,858,057 | A | 1/1999 | Celada-Gonzalez et al. |
| 5,882,579 | A | 3/1999 | Viramontes-Brown et al. |
| 5,958,107 | A | 9/1999 | Greenwalt |
| 6,027,545 | A | 2/2000 | Villarreal-Trevino |
| 6,033,456 | A | 3/2000 | Jahnke |
| 6,039,916 | A | 3/2000 | Celada-Gonzalez et al. |
| 6,045,602 | A | 4/2000 | Shah et al. |
| 6,149,859 | A | 11/2000 | Jahnke et al. |
| 6,183,535 | B1 * | 2/2001 | De-Gyves-De-la-Pena et al. ............. 75/495 |
| 6,197,088 | B1 | 3/2001 | Greenwalt |
| 6,395,056 | B1 * | 5/2002 | Villarreal-Trevino et al. . 75/496 |
| 6,562,103 | B2 | 5/2003 | Sethna et al. |
| 6,986,800 | B2 | 1/2006 | Duarte-Escareno et al. |
| 2003/0047037 | A1 | 3/2003 | Sethna et al. |
| 2003/0097908 | A1 * | 5/2003 | Hoffman et al. ............. 75/484 |
| 2007/0245855 | A1 | 10/2007 | Zendejas-Martinez |

\* cited by examiner

METHOD AND APPARATUS FOR SEQUESTERING CARBON DIOXIDE FROM A SPENT GAS

CROSS-REFERENCE TO RELATED APPLICATION

The present non-provisional patent application/patent claims the benefit of priority of U.S. Provisional Patent Application Ser. No. 61/170,999, filed on Apr. 20, 2009, and entitled "Method and Apparatus for Sequestering Carbon Dioxide From a Top Gas Fuel," the contents of which are incorporated in full by reference herein.

FIELD OF THE INVENTION

The present invention relates generally to a method and apparatus for the direct reduction of iron oxide to metallic iron, among other processes. More specifically, the present invention relates to a method and apparatus for sequestering carbon dioxide from a spent gas in association with such processes.

BACKGROUND OF THE INVENTION

A need exists in many industrial processes for an effective and efficient method for removing carbon dioxide from a secondary fuel source, such as a top gas fuel source, in a direct reduction process. In other words, a need exists in many industrial processes for an effective and efficient method for removing carbon dioxide from an otherwise waste fuel source, allowing it to be used as a primary fuel source without emissions problems. In some cases, government policy has required such carbon dioxide removal, and the need for carbon dioxide emissions control will only increase in the future. Direct reduction involves the reduction of iron oxide ores into metalized iron pellets, lumps, or compacts, where the iron oxide is reduced by a gas containing hydrogen and/or carbon monoxide, resulting in a carbon dioxide byproduct.

BRIEF SUMMARY OF THE INVENTION

In one exemplary embodiment of the present invention, a method for sequestering carbon dioxide from a top gas fuel, includes: given a top gas divided into a process gas and a top gas fuel: mixing the process gas with a hydrocarbon and feeding a resulting reformer feed gas into a carbon dioxide and steam reformer for reforming the reformer feed gas and forming a reducing gas; and feeding the top gas fuel into a carbon dioxide scrubber for removing at least some carbon dioxide from the top gas fuel and forming a reformer fuel gas after the addition of a hydrocarbon that is fed into the carbon dioxide and steam reformer. The method also includes compressing the process gas and the top gas fuel. The method further includes generating steam from the top gas. The method still further includes scrubbing the top gas to remove dust. Optionally, the top gas is obtained from a reduction furnace. Optionally, the method still further includes mixing the reducing gas with oxygen and a hydrocarbon to form a bustle gas and feeding the bustle gas into the reduction furnace. The carbon dioxide scrubber also produces carbon dioxide lean gas. The method still further includes mixing the carbon dioxide lean gas with the reducing gas. Optionally, the method still further includes preheating the carbon dioxide lean gas before mixing it with the reducing gas or using it as fuel. The carbon dioxide and steam reformer also produces flue gas. The method still further includes generating steam from the flue gas. Optionally, the method still further includes using the flue gas to preheat another gas. Optionally, the top gas and the bustle gas are associated with a direct reduction process for converting iron oxide to metallic iron.

In another exemplary embodiment of the present invention, an apparatus for sequestering carbon dioxide from a top gas fuel, includes: one or more conduits for dividing a top gas into a process gas and a top gas fuel; one or more conduits for mixing the process gas with a hydrocarbon and feeding a resulting reformer feed gas into a carbon dioxide and steam reformer for reforming the reformer feed gas and forming a reducing gas; and one or more conduits for feeding the top gas fuel into a carbon dioxide scrubber for removing at least some carbon dioxide from the top gas fuel and forming a reformer fuel gas after the addition of a hydrocarbon that is fed into the carbon dioxide and steam reformer. The apparatus also includes one or more gas compressors for compressing the process gas and the top gas fuel. The apparatus further includes a low-pressure steam boiler for generating steam from the top gas. The apparatus still further includes a wet scrubber for scrubbing the top gas to remove dust. Optionally, the top gas is obtained from a reduction furnace. Optionally, the apparatus still further includes one or more conduits for mixing the reducing gas with oxygen and a hydrocarbon to form a bustle gas and feeding the bustle gas into the reduction furnace. The carbon dioxide scrubber also produces carbon dioxide lean gas. The apparatus still further includes one or more conduits for mixing the carbon dioxide lean gas with the reducing gas. Optionally, the apparatus still further includes a preheater for preheating the carbon dioxide lean gas before mixing it with the reducing gas or using it as fuel. The carbon dioxide and steam reformer also produces flue gas. The apparatus still further includes a low-pressure steam boiler for generating steam from the flue gas. Optionally, the apparatus still further includes one or more conduits for using the flue gas to preheat another gas. Optionally, the top gas and the bustle gas are associated with a direct reduction process for converting iron oxide to metallic iron.

In a further exemplary embodiment of the present invention, a method for sequestering carbon dioxide from a waste gas and reusing it as a recycled gas without emissions concerns, includes: given a gas source divided into a process gas and a waste gas: mixing the process gas with a hydrocarbon and feeding a resulting feed gas into a reformer for reforming the feed gas and forming a reducing gas; and feeding at least a portion of the waste gas into a carbon dioxide scrubber for removing at least some carbon dioxide from the waste gas and forming a carbon dioxide lean gas that is mixed with the reducing gas. Optionally, the method also includes feeding at least a portion of the waste gas into the carbon dioxide scrubber for removing at least some carbon dioxide from the waste gas and forming a fuel gas after the addition of a hydrocarbon that is fed into the reformer.

The carbon dioxide sequestration processes of the present invention provide an efficient loop by which carbon monoxide and hydrogen not used in a primary process and expelled as waste gas may be recaptured, while minimizing unwanted emissions.

BRIEF DESCRIPTION OF THE DRAWINGS

The present invention is illustrated and described herein with reference to the various drawings, in which like reference numbers are used to denote like method steps/apparatus components, as appropriate, and in which.

DETAILED DESCRIPTION OF THE INVENTION

Figure 1:
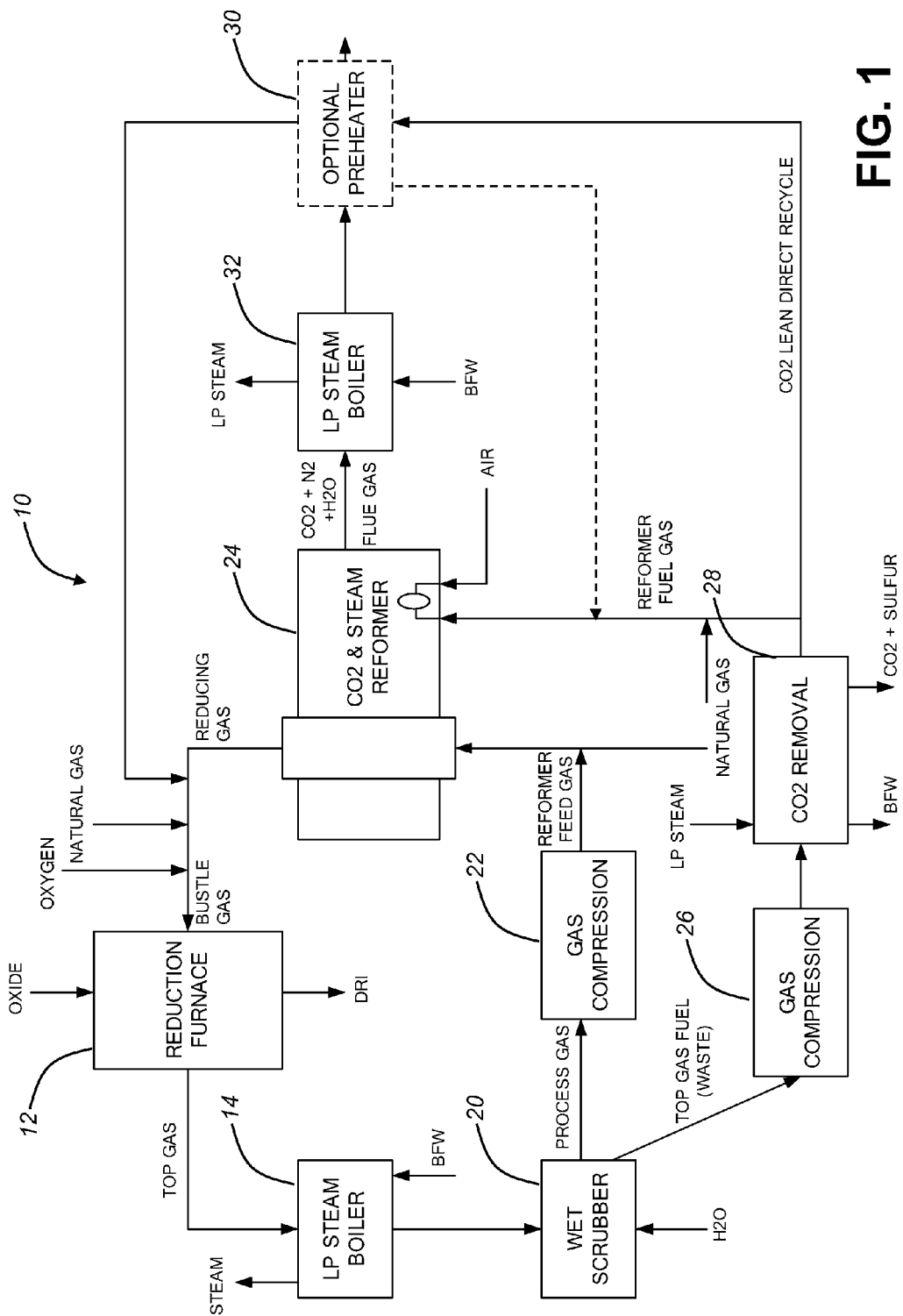
FIG. 1 is a process/schematic diagram of the method/apparatus for sequestering carbon dioxide from a top gas fuel of the present invention.

Referring to FIG. 1, in one exemplary embodiment of the present invention, the apparatus for sequestering carbon dioxide from a top gas fuel 10 inherently includes a vertical shaft-type reduction furnace 12 or the like. In this example, the reduction furnace 12 includes a feed hopper (not illustrated) into which iron oxide pellets, lumps, or compacts are fed at a predetermined rate. The iron oxide pellets, lumps, or compacts descend by gravity into the reduction furnace 12 from the feed hopper through a feed pipe (not illustrated), which also serves as a gas seal pipe. At the bottom of the reduction furnace 12 is a discharge pipe (not illustrated), which further serves as a gas seal pipe. A discharge feeder (not illustrated), such as an electric vibrating feeder or the like, is disposed below the discharge pipe and receives the metallic iron pellets, lumps, or compacts, thereby establishing a system for the gravitational descent of the burden through the reduction furnace 12.

At approximately the midpoint of the reduction furnace 12 is a bustle and tuyere system (not illustrated), through which the hot reducing gas is introduced at a temperature of between about 700 degrees C. and about 1050 degrees C. The hot reducing gas flows upwards through a reduction region of the reduction furnace 12, counter to the flow of the pellets, lumps, or compacts, and exits the reduction furnace 12 through a gas off-take pipe (not illustrated) located at the top of the reduction furnace 12. The feed pipe extends below the gas off-take pipe, this geometric arrangement creating a spent gas disengaging plenum that permits spent gas to disengage from the stock line and flow freely to the gas off-take pipe. The hot reducing gas, in flowing from the bustle and tuyere system to the gas off-take pipe, serves to heat the iron oxide pellets, lumps, or compacts and reduce them to metallic iron pellets, lumps, or compacts (i.e. via direct reduction). The hot reducing gas contains hydrogen, nitrogen, carbon monoxide, carbon dioxide, methane, and water vapor that reduce the iron oxide pellets, lumps, or compacts and produce a spent gas, or top gas, containing carbon dioxide and water vapor.

Figure 2:
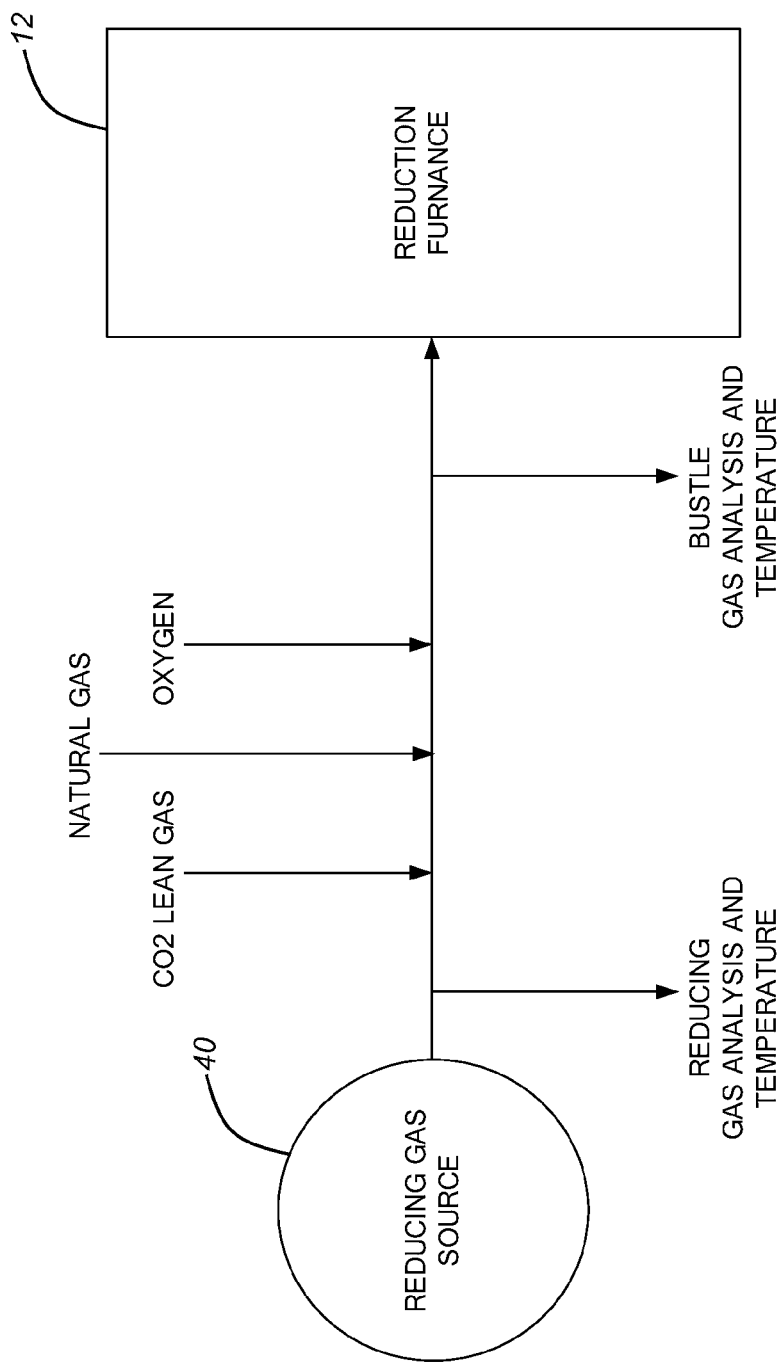
FIG. 2 is a process/schematic diagram of the direct reduction process of the present invention.

Referring to FIG. 2, the direct reduction processes utilized herein control the reduction conditions, temperatures, and chemistries at the point where the bustle gas enters the reduction furnace 12 by adjusting the carbon dioxide lean gas, natural gas, and oxygen additions to the reducing gas just prior. These direct reduction processes are described generally in U.S. Pat. No. 3,748,120, entitled "Method of Reducing Iron Oxide to Metallic Iron," U.S. Pat. No. 3,749,386, entitled "Method for Reducing Iron Oxides in a Gaseous Reduction Process," U.S. Pat. No. 3,764,123, entitled "Apparatus for Reducing Iron Oxide to Metallic Iron," U.S. Pat. No. 3,816,101, entitled "Method for Reducing Iron Oxides in a Gaseous Reduction Process," U.S. Pat. No. 4,046,557, entitled "Method for Producing Metallic Iron Particles," and U.S. Pat. No. 5,437,708, entitled "Iron Carbide Production in Shaft Furnace," the contents of all of which are incorporated in full by reference herein.

The reduction furnace burden acts as a large adiabatic reactor and promotes equilibrium reactions in the zone of the bustle gas injection. As the bustle gas enters the reduction furnace 12 and passes through the burden, the gas reacts to its equilibrium composition and temperature, which is observed on the burden thermocouples at the upper portion of the reduction furnace 12.

The carburizing reactions are affected by the following reducing gas stream factors:
1. Initial reducing gas hydrogen:carbon monoxide ratio;
2. Initial reducing gas methane content;
3. Initial reducing gas temperature;
4. Natural gas addition to reducing gas;
5. Oxygen addition to reducing gas;
6. Carbon dioxide lean gas addition to reducing gas;
7. Final bustle gas reductant:oxidant ratio; and
8. Final bustle gas pressure Under normal operating conditions, the initial reducing gas quality is closely controlled and becomes the primary stability factor for the direct reduction process. As the reducing gas flows towards the reduction furnace 12, natural gas is added based on the methane content analysis of the final bustle gas. This provides a stabilizing adjustment for any variation in the methane content of the initial reducing gas, and affects the carburizing potential of the final bustle gas. Oxygen is added to the reducing gas to increase the temperature of the final bustle gas and improve the kinetics of the iron ore reduction process.

Optionally, the operating conditions used include preheating the natural gas addition, reducing gas methane content equal to or less than about 12 percent, and oxygen addition flow/ton equal to or less than about 30 $Nm^3/t$.

During use of the direct reduction apparatus, gas exits the reducing gas source 40 and a first sensor performs a gas analyses and measures the temperature of the gas. Natural gas is then mixed with the gas at the natural gas inlet. Oxygen is then mixed with the gas and natural gas mixture at the oxygen inlet, thereby forming the bustle gas. The second sensor performs a gas analysis and measures the temperature of the bustle gas, prior to the bustle gas entering the reduction furnace 12.

Referring again to FIG. 1, in accordance with the present invention, the top gas from the gas off-take pipe of the reduction furnace 12 flows through another pipe (not illustrated) to a low-pressure steam boiler 14. This allows for the efficient generation of steam for use elsewhere in the process, such as in the carbon dioxide removal step described in greater detail herein below. Boiler feed water is fed to the low-pressure steam boiler 14 and, as alluded to herein above, the steam generated is recirculated through the process or used elsewhere.

The top gas is then directed to a wet scrubber 20 that is provided to cool the top gas and remove dust, with a water output. The wet scrubber 20 may be of any conventional type known to those of ordinary skill in the art, such as a venturi with a packed tower (not illustrated), with the top gas flowing downwards through the venturi and then upwards through the packing counterflow to cooling water.

The top gas exits the wet scrubber 20 in two streams by the influence of a valve (not illustrated). The first stream represents process gas and the second gas represents top gas fuel (i.e. waste). The ratio of these streams is defined by the available heat in a carbon dioxide and steam reformer 24 coupled to the first stream, which is typically constant, resulting in an exemplary ratio of 1:1 (with the use of recycled carbon dioxide lean gas), 2:1 (without the use of recycled carbon dioxide lean gas), etc.

The process gas from the wet scrubber 20 is fed to a compressor 22 and compressed to a desired pressure, and then fed to a mixer (not illustrated), where the process gas is mixed with natural gas. This reformer feed gas is then fed into the carbon dioxide and steam reformer 24. The carbon dioxide and steam reformer 24 includes fuel-fired burners (not illustrated), producing heated flue gas containing nitrogen, carbon dioxide, and water via combustion and a plurality of catalytic reformer tubes (not illustrated), the later of which utilize reformer feed gas and heat from the combustion to form reducing gas which is fed back into the reduction furnace 12 after the introduction of oxygen, natural gas, and carbon dioxide lean gas, resulting in bustle gas.

The top gas fuel from the wet scrubber 20 is also fed to a compressor 26 and compressed to a desired pressure, prior to introduction into a carbon dioxide scrubber 28. The carbon dioxide scrubber 28 has an input of low-pressure steam, optionally obtained from any of the low-pressure steam boilers 14, 32 of the apparatus for sequestering carbon dioxide from a top gas fuel 10, and outputs of boiler feed water, sulfur, and carbon dioxide. The boiler feed water may be input into any of the low-pressure steam boilers 14, 32 of the apparatus for sequestering carbon dioxide from a top gas fuel 10. Another output of the carbon dioxide scrubber 28 is carbon dioxide lean gas, which when mixed with natural gas becomes, in part, the reformer fuel gas that is fed into the carbon dioxide and steam reformer 24.

The carbon dioxide scrubber 28 may include any type of alkanolamine, such as MEA, MDEA, or the like, or any type of hot potassium scrubbing system known to those of ordinary skill in the art. The low-pressure steam is used to regenerate the solution used in the carbon dioxide scrubber 28, and exits as the boiler feed water. During the carbon dioxide scrubbing process, the sulfur and carbon dioxide are sequestered from the top gas fuel. The top gas fuel minus the sulfur and carbon dioxide exits the carbon dioxide scrubber 28 as the carbon dioxide lean gas. Again, a portion of the carbon dioxide lean gas is mixed with natural gas to form the reformer fuel gas, and is introduced into the carbon dioxide and steam reformer 24 via the fuel-fired burners. The remainder of the carbon dioxide lean gas is recycled and mixed with the reducing gas, which is fed back into the reduction furnace 12 after the introduction of oxygen and natural gas, thereby forming the bustle gas. Optionally, later portion of the carbon dioxide lean gas, or the entire stream, is introduced into a preheater 30 prior to mixing with the existing reducing gas or using it as fuel.

In one exemplary embodiment of the present invention, this carbon dioxide lean gas/reducing gas stream ultimately represents about 20 percent of the bustle gas supply to the reduction furnace 12, while the carbon dioxide and steam reformer reducing gas stream ultimately represents about 80 percent of the bustle gas supply to the reduction furnace 12, although other percentages are contemplated herein.

A flue gas off-take pipe (not illustrated) is provided on the carbon dioxide and steam reformer 24 for removing the flue gas containing nitrogen, carbon dioxide, and water after combustion. The flue gas flows through one or several heat exchangers, including a low-pressure steam boiler 32. Again, this allows for the efficient generation of steam for use elsewhere in the process, such as in the carbon dioxide removal step described in greater detail herein above. Boiler feed water is fed to the low-pressure steam boiler 32, optionally from the carbon dioxide scrubber 28, and, as alluded to herein above, the steam generated is recirculated through the process or used elsewhere. The low-pressure steam boiler 32 may thus be coupled to the optional preheater 30.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims. In this respect, the above detailed description of the present invention is to be considered non-limiting and all-encompassing to the greatest extent possible.

What is claimed is:

1. A method for sequestering carbon dioxide from a top gas fuel, comprising:
    given a top gas divided into a process gas and a top gas fuel:
        mixing the process gas with a hydrocarbon and feeding a resulting reformer feed gas into a carbon dioxide and steam reformer for reforming the reformer feed gas and forming a reducing gas; and
        feeding at least a portion of the top gas fuel into a carbon dioxide scrubber for removing at least some carbon dioxide from the top gas fuel and forming a carbon dioxide lean gas that is selectively mixed with the reducing gas;
    wherein a volume ratio of the process gas to the top gas fuel is responsive to available heat in the carbon dioxide and steam reformer to which the reformer feed gas is fed; and
    wherein the volume ratio of the process gas to the top gas fuel is 1:1 when the carbon dioxide lean gas is fully utilized for mixing with the reducing gas and is 2:1 when the carbon dioxide lean gas is not utilized for mixing with the reducing gas.

2. The method of claim 1, further comprising feeding at least a portion of the top gas fuel into the carbon dioxide scrubber for removing at least some carbon dioxide from the top gas fuel and forming a reformer fuel gas after the addition of a hydrocarbon that is fed into the carbon dioxide and steam reformer.

3. The method of claim 2, further comprising compressing the process gas and the top gas fuel.

4. The method of claim 1, further comprising generating steam from the top gas.

5. The method of claim 4, further comprising scrubbing the top gas to remove dust.

6. The method of claim 1, wherein the top gas is obtained from a reduction furnace.

7. The method of claim 1, further comprising mixing the reducing gas with oxygen and a hydrocarbon to form bustle gas and feeding the bustle gas into a reduction furnace.

8. The method of claim 1, further comprising preheating the carbon dioxide lean gas before mixing it with the reducing gas.

9. The method of claim 1, wherein the carbon dioxide and steam reformer also produces flue gas.

10. The method of claim 9, further comprising generating steam from the flue gas.

11. The method of claim 10, further comprising using the flue gas to preheat another gas.

12. The method of claim 1, wherein the top gas and the reducing gas are associated with a direct reduction process for converting iron oxide to metallic iron.

13. A method for sequestering carbon dioxide from a waste gas and reusing it as a recycled gas without emissions concerns, comprising:
    given a gas source divided into a process gas and a waste gas:
        mixing the process gas with a hydrocarbon and feeding a resulting feed gas into a reformer for reforming the feed gas and forming a reducing gas; and feeding at least a portion of the waste gas into a carbon dioxide scrubber for removing at least some carbon dioxide from the waste gas and forming a carbon dioxide lean gas that is selectively mixed with the reducing gas;

wherein a volume ratio of the process gas to the waste gas is responsive to available heat in the reformer to which the feed gas is fed; and wherein the volume ratio of the process gas to the waste gas is 1:1 when the carbon dioxide lean gas is fully utilized for mixing with the reducing gas and is 2:1 when the carbon dioxide lean gas is not utilized for mixing with the reducing gas.

14. The method of claim 13, further comprising feeding at least a portion of the waste gas into the carbon dioxide scrubber for removing at least some carbon dioxide from the waste gas and forming a fuel gas after the addition of a hydrocarbon that is fed into the reformer.

* * * * *

(12) EX PARTE REEXAMINATION CERTIFICATE (10207th)
United States Patent
Metius et al.

(10) Number: US 8,377,417 C1
(45) Certificate Issued: Jun. 26, 2014

(54) METHOD AND APPARATUS FOR SEQUESTERING CARBON DIOXIDE FROM A SPENT GAS

(75) Inventors: Gary E. Metius, Charlotte, NC (US); James M. McClelland, Jr., Cornelius, NC (US)

(73) Assignee: Midrex Technologies, Inc., Charlotte, NC (US)

Reexamination Request:
No. 90/013,041, Oct. 24, 2013

Reexamination Certificate for:
Patent No.: 8,377,417
Issued: Feb. 19, 2013
Appl. No.: 12/762,618
Filed: Apr. 19, 2010

Related U.S. Application Data

(60) Provisional application No. 61/170,999, filed on Apr. 20, 2009.

(51) Int. Cl.
*C01B 3/24* (2006.01)
*C01B 3/38* (2006.01)
*B01D 53/14* (2006.01)
*F27D 17/00* (2006.01)

(52) U.S. Cl.
CPC .......... *B01D 53/1475* (2013.01); *F27D 17/004* (2013.01)
USPC .......................................... 423/650; 252/373

(58) Field of Classification Search
None
See application file for complete search history.

(56) References Cited

To view the complete listing of prior art documents cited during the proceeding for Reexamination Control Number 90/013,041, please refer to the USPTO's public Patent Application Information Retrieval (PAIR) system under the Display References tab.

*Primary Examiner* — Norca L Torres Velazquez

(57) ABSTRACT

A method and apparatus for sequestering carbon dioxide from a waste gas and reusing it as a recycled gas without emissions concerns, including: given a gas source divided into a process gas and a waste gas: mixing the process gas with a hydrocarbon and feeding a resulting feed gas into a reformer for reforming the feed gas and forming a reducing gas; and feeding at least a portion of the waste gas into a carbon dioxide scrubber for removing at least some carbon dioxide from the waste gas and forming a carbon dioxide lean gas that is mixed with the reducing gas. Optionally, the method also includes feeding at least a portion of the waste gas into the carbon dioxide scrubber for removing at least some carbon dioxide from the waste gas and forming a fuel gas after the addition of a hydrocarbon that is fed into the reformer. Optionally, the gas source and the reducing gas are associated with a direct reduction process for converting iron oxide to metallic iron in a reduction furnace that utilizes the reducing gas, optionally after some modification, and produces the gas source.

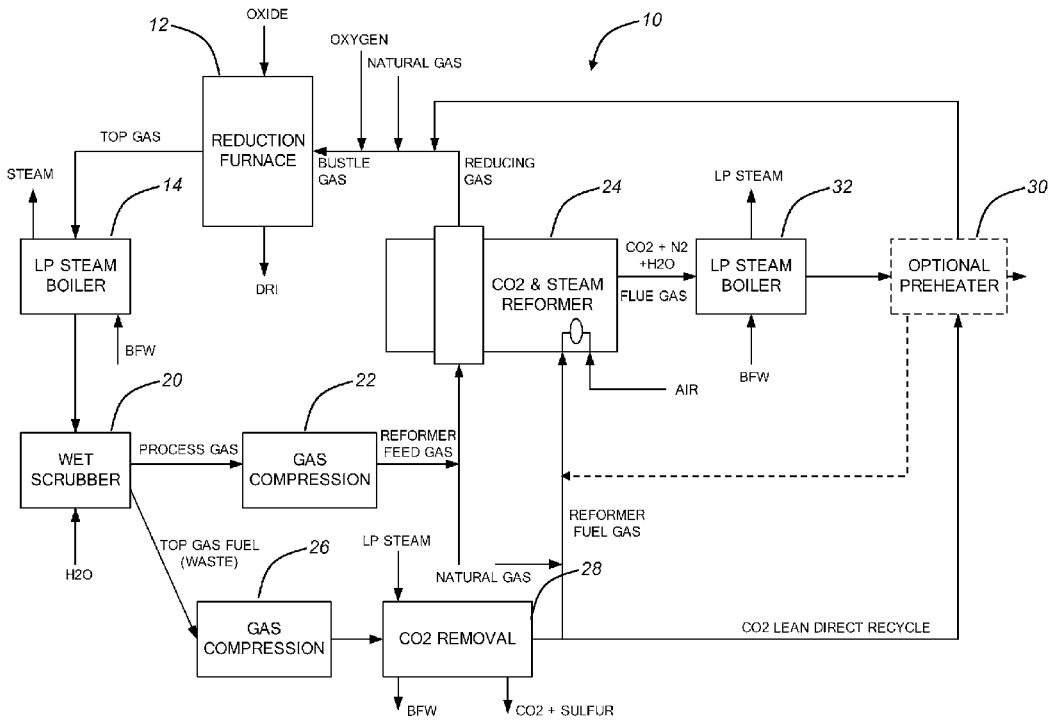

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

\* \* \* \* \*